(12) United States Patent
Kito et al.

(10) Patent No.: US 7,011,064 B2
(45) Date of Patent: Mar. 14, 2006

(54) INTAKE MANIFOLD

(75) Inventors: Kazuyori Kito, Kanagawa (JP);
Tomonori Ikuma, Saitama (JP)

(73) Assignees: Mikuni Corporation, Tokyo (JP);
Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/866,118

(22) Filed: Jun. 14, 2004

(65) Prior Publication Data

US 2004/0261745 A1    Dec. 30, 2004

(30) Foreign Application Priority Data

Jun. 13, 2003  (JP)  .......................... P2003-168880

(51) Int. Cl.
*F02M 35/10*   (2006.01)

(52) U.S. Cl. .............................. 123/184.2; 123/184.32

(58) Field of Classification Search ............. 123/184.2, 123/184.34, 184.35, 184.42–184.44, 184.47–184.49, 123/184.51, 184.36
See application file for complete search history.

(56) References Cited

U.S. PATENT DOCUMENTS

| 4,771,740 A | * | 9/1988 | Koike ................... 123/184.42 |
| 4,890,586 A | * | 1/1990 | Fujii et al. ............. 123/184.55 |
| 4,977,865 A | * | 12/1990 | Hiraoka et al. ........ 123/184.36 |
| 5,852,929 A | * | 12/1998 | Kato et al. ..................... 60/274 |
| 6,367,893 B1 | * | 4/2002 | Mizutani et al. ............ 303/191 |
| 2005/0016487 A1 | * | 1/2005 | Ikuma et al. ........... 123/184.42 |

FOREIGN PATENT DOCUMENTS

| JP | 07-332181 | 12/1995 |
| JP | 08-100722 | 4/1996 |
| JP | 10-231760 | 9/1998 |
| JP | 2000-220540 | 8/2000 |
| JP | 2002-242773 | 8/2002 |

* cited by examiner

*Primary Examiner*—John T. Kwon

(57) ABSTRACT

An intake manifold is provided that comprises a plurality of intake ducts, a surge tank, a vacuum chamber, and a negative pressure check valve. The negative pressure check valve enables negative pressure induced in the surge tank to flow into the vacuum chamber. Each upstream end of the intake ducts protrudes into the inside of the surge tank. Further, a pressure inlet formed inside the surge tank, to lead the negative pressure induced inside the surge tank to the negative pressure check valve, is positioned on a side closer to an engine than the respective upstream ends of the intake ducts.

6 Claims, 5 Drawing Sheets

INTAKE MANIFOLD

BACKGROUND OF THE INVENTION

1. Field of the Invention

The present invention relates to an intake manifold for an engine, in particular to a mounting position of a negative pressure check valve provided for an intake manifold.

2. Description of the Related Art

Conventionally, an air actuator using negative pressure in a vacuum chamber is widely employed in various applications. Negative pressure is induced inside a surge tank of an intake manifold and fluctuates, and the lowest negative pressure is maintained in the vacuum chamber. The air actuator is arranged nearby the intake manifold, and is used to carry out open/shut operations of an intake valve that generates air column resonance, in immediate response to the engine operations. The negative pressure is accumulated and maintained inside the vacuum chamber by using a negative pressure check valve, which opens only when the pressure inside the surge tank becomes lower than the pressure inside the vacuum chamber. Therefore the vacuum chamber stores the negative pressure induced by the air pulsation or air dynamics inside the surge tank (i.e., creates a stronger vacuum). Japanese unexamined patent publication (KOKAI) No. 8-100722 discloses an intake manifold that arranges the vacuum chamber next to the surge tank and provides the negative pressure check valve on a partition wall between the vacuum chamber and the surge tank, so as to make the structure relating to the vacuum chamber and the negative pressure check valve compact.

SUMMARY OF THE INVENTION

However, in the intake manifold disclosed in the above publication, the negative pressure check valve is positioned inside the surge tank near where the intake gas passes through. Therefore, blowback from an engine may directly blow onto the negative pressure check valve and the valve may be adversely affected.

An aspect of the present invention is to reduce the adverse effects of blowback from an engine, on a negative pressure check valve provided on an intake manifold.

According to the present invention, an intake manifold is provided that comprises a plurality of intake ducts, a surge tank, a vacuum chamber, and a negative pressure check valve.

The negative pressure check valve enables negative pressure induced in the surge tank to flow into the vacuum chamber. Each upstream end of the intake ducts protrudes into the inside of the surge tank. Further, a pressure inlet formed inside the surge tank, to lead the negative pressure induced inside the surge tank to the negative pressure check valve, is positioned on a side closer to an engine than the respective upstream ends of the intake ducts.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
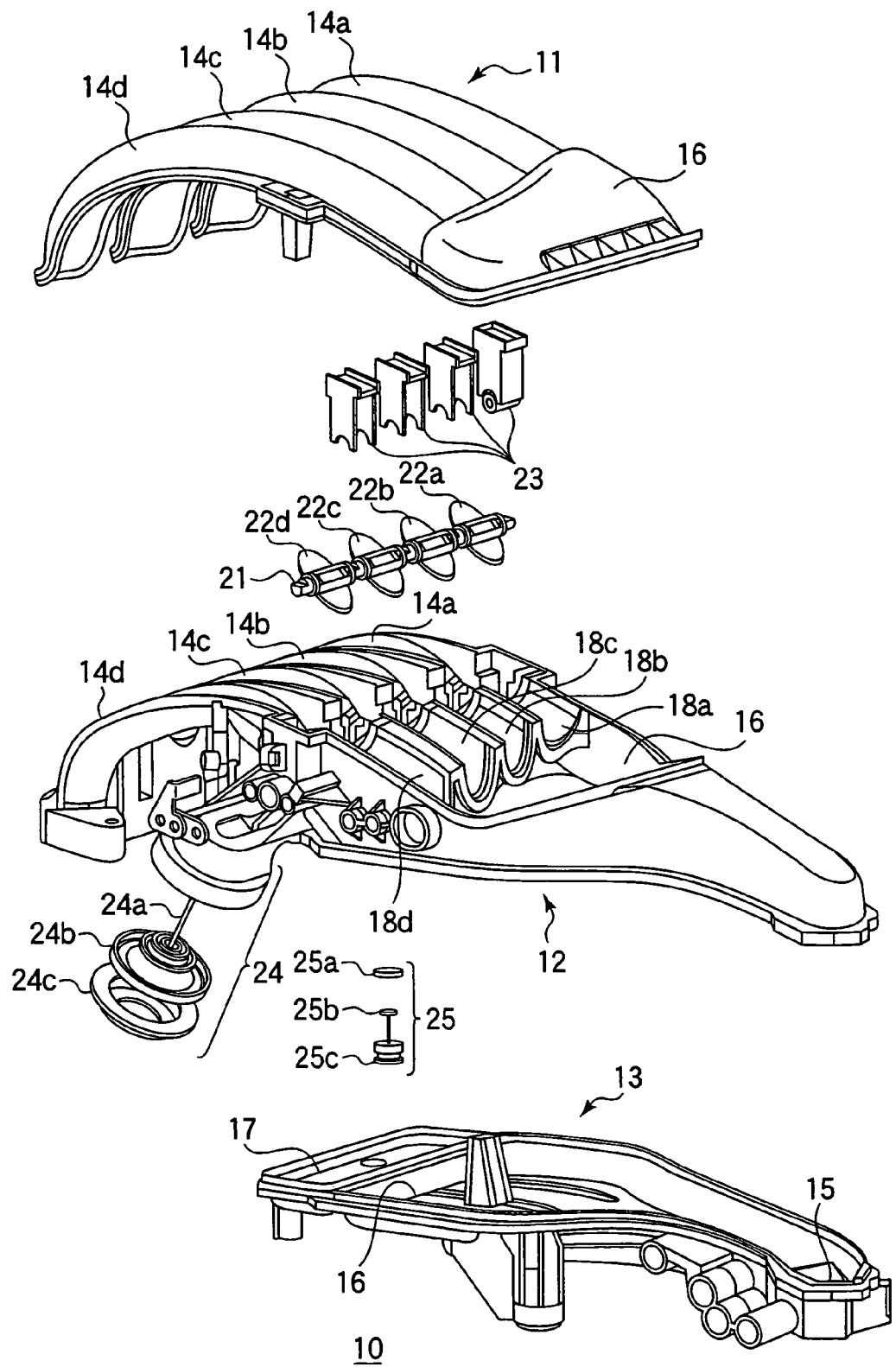
FIG. 1 is an exploded perspective of a resin-made intake manifold for an outboard motor as an embodiment of the present invention.

The present invention is described below with reference to the embodiments shown in the drawings.

Figure 2:
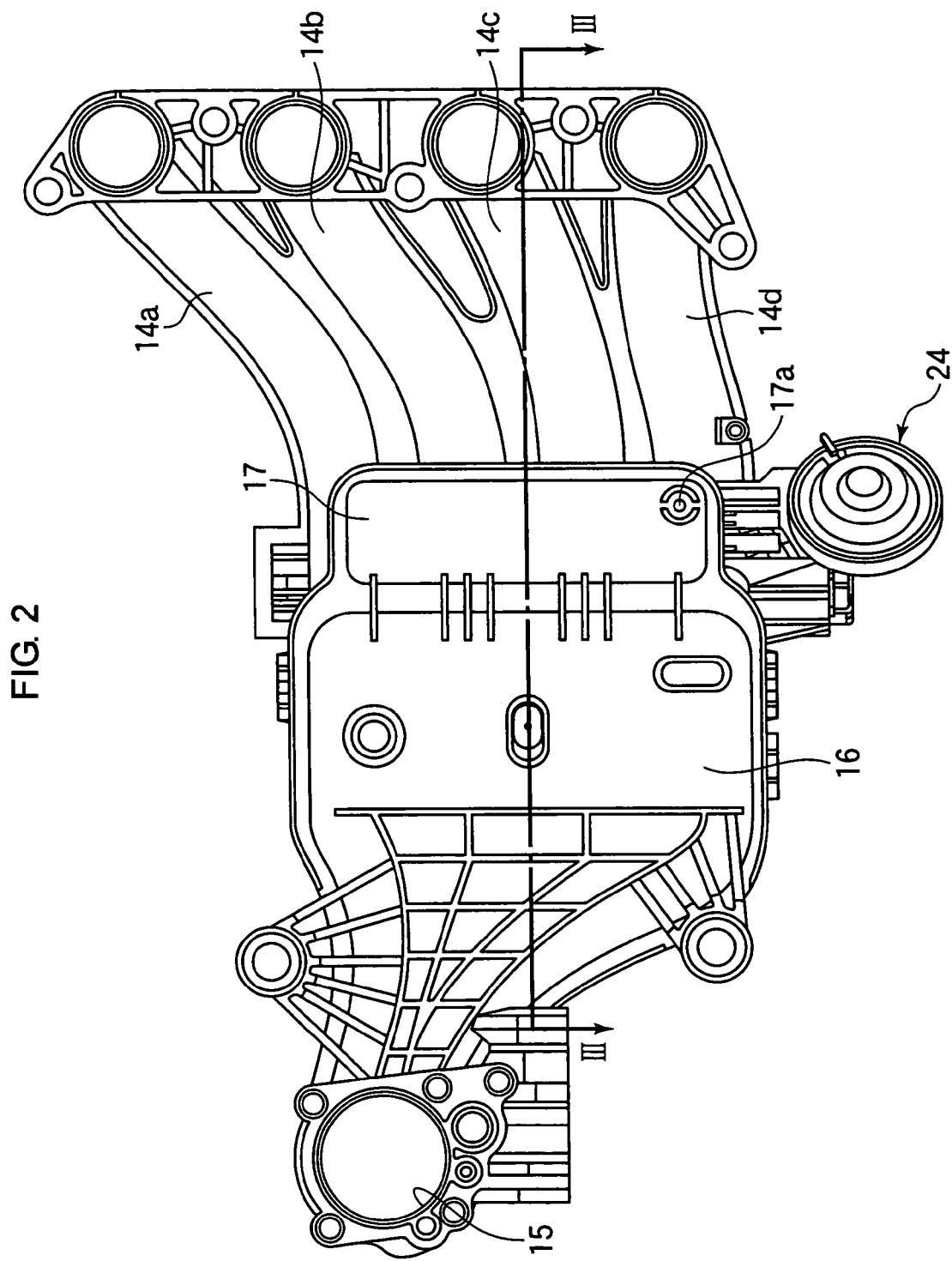
FIG. 2 is a bottom view of the assembled intake manifold.
Figure 3:
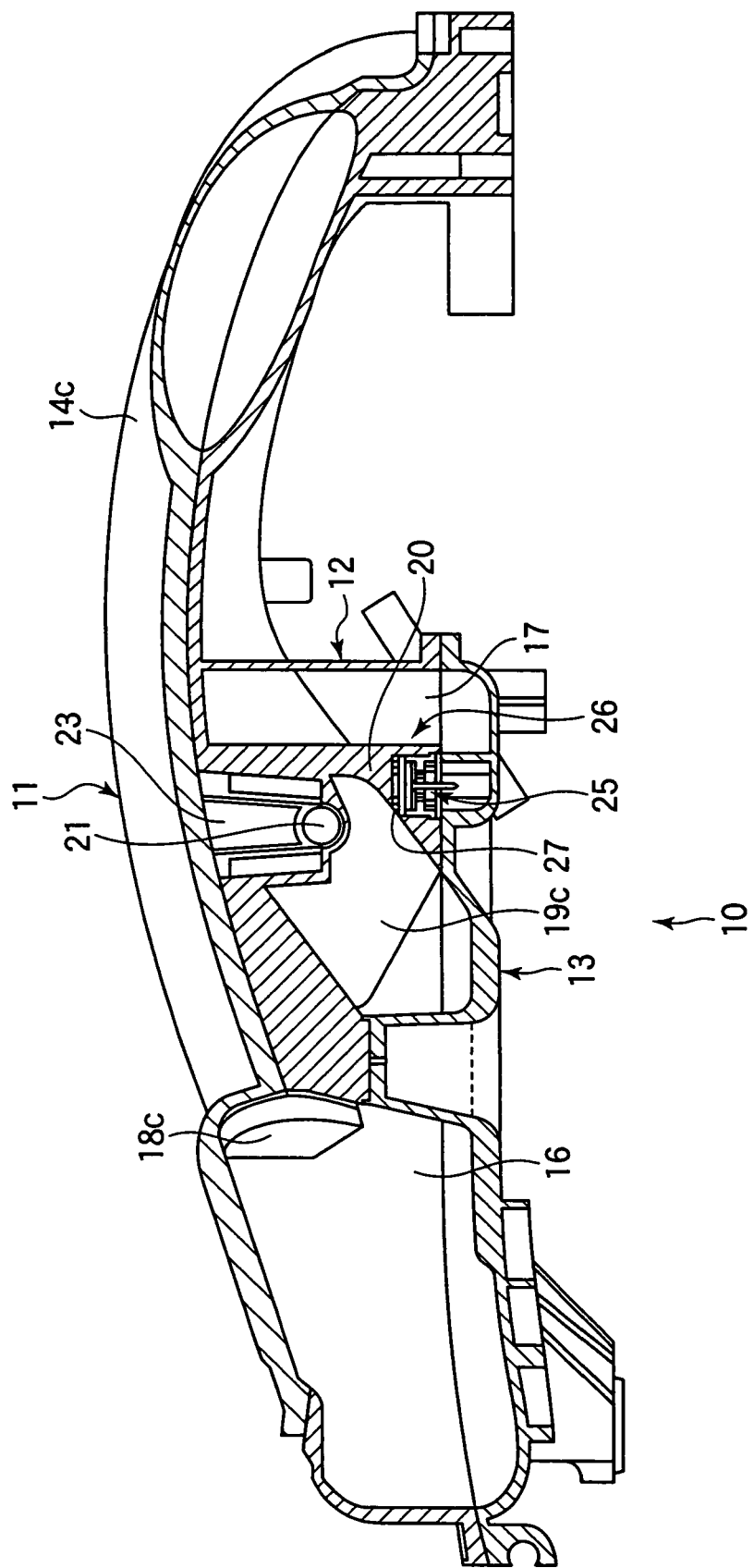
FIG. 3 is a cross sectional view along segment III—III of FIG. 2.

FIG. 1 is an exploded perspective of a resin-made intake manifold for an outboard motor as an embodiment of the present invention. FIG. 2 is a bottom view of the intake manifold which has been assembled. Further, FIG. 3 is a cross sectional view along segment III—III of FIG. 2. With reference to FIGS. 1 to 3, the general construction of the intake manifold of the present embodiment will be explained.

As illustrated in FIG. 1, the intake manifold 10 of the present embodiment includes three sectional blocks, such as, an upper section block 11, a midsection block 12, and a lower section block 13. These three blocks are integrally formed by means of vibration welding. As shown in FIG. 2, the downstream side, or the engine side, of the intake manifold 10 is separated into four main intake ducts 14a, 14b, 14c, and 14d, for example, and each ducts is connected to an intake port of a respective cylinder head of the four-cylinder engine (not shown). On the other hand, the upstream side or the air cleaner side of the intake manifold 10 is provided with a throttle mounting port 15 to which a throttle body (not shown) is attached.

With reference to FIG. 3, a surge tank 16 and a vacuum chamber 17 are provided inside the intake manifold 10. Eight bifurcated ducts, which are comprised of four upper ducts 18a–18d and four lower ducts 19a–19d, are connected to the surge tank 16. Each of the upper bifurcated ducts 18a–18d is paired with a corresponding lower bifurcated duct 19a–19d and the bifurcated ducts included in each pair, are joined together on the downstream side and form the respective main intake ducts 14a–14d. Namely, each pair of bifurcated ducts 18a–18d and main ducts 14a–14d or each pair of bifurcated ducts 19a–19d and main ducts 14a–14d form one integrate continuous intake duct. Further, the length of the upper bifurcated ducts 18a–18d is longer than the length of the lower bifurcated ducts 19a–19d, so that the upstream ends of the upper bifurcated ducts 18a–18d, inside the surge tank 16, are aligned further on the upstream side, or the side apart from the engine, than those of the lower bifurcated ducts 19a–19d. Further, the vacuum chamber 17 is arranged on the downstream side or the side close to the engine with respect to the upstream ends of the bifurcated ducts 19a–19d, and is separated from the surge tank 16 by a partition wall 20.

Inside each of the lower bifurcated ducts 19a–19d, respective valves 22a–22d, which are connected to a shaft 21, are disposed. The shaft 21 is journaled by four retainers 23 and one end of the shaft 21 is connected to a rod 24a of a pneumatic air actuator 24, which is provided on a side of the intake manifold 10, through a lever. Further, the rod 24a is connected to a diaphragm 24b. The actuator 24 is hermetically sealed by a diaphragm cover 24c and is connected to the vacuum chamber 17 through a pipe (not shown) interconnecting the diaphragm cover 24c and a pipe connecting section 17a provided on the base of the vacuum chamber 17. Namely, the open/shut operations of the valves 22a–22d are actuated by motion of the diaphragm 24b induced by the negative pressure supplied from the vacuum chamber 17. The negative pressure supply from the vacuum chamber 17 to the actuator 24 is controlled by a control valve (not shown) provided on the pipe which interconnects the actuator 24 and the vacuum chamber 17, and the control valve may be electronically actuated and controlled.

Note that, the upper section of block 11 includes each of the upper sections of the main ducts 14a–14d, the bifurcated ducts 18a–18d, and the surge tank 17. The midsection block 12 includes the lower section of the main ducts 14a–14d, the upper section of the vacuum chamber 17, the lower section of the bifurcated ducts 18a–18d, the bifurcated ducts 19a–19d, the body section for accepting the diaphragm 24b, and the midsection of the surge tank 16. Further, the lower section block 13 includes each bottom section of the surge tank 16 and the vacuum chamber 17, and the throttle mounting port 15.

Figure 4:
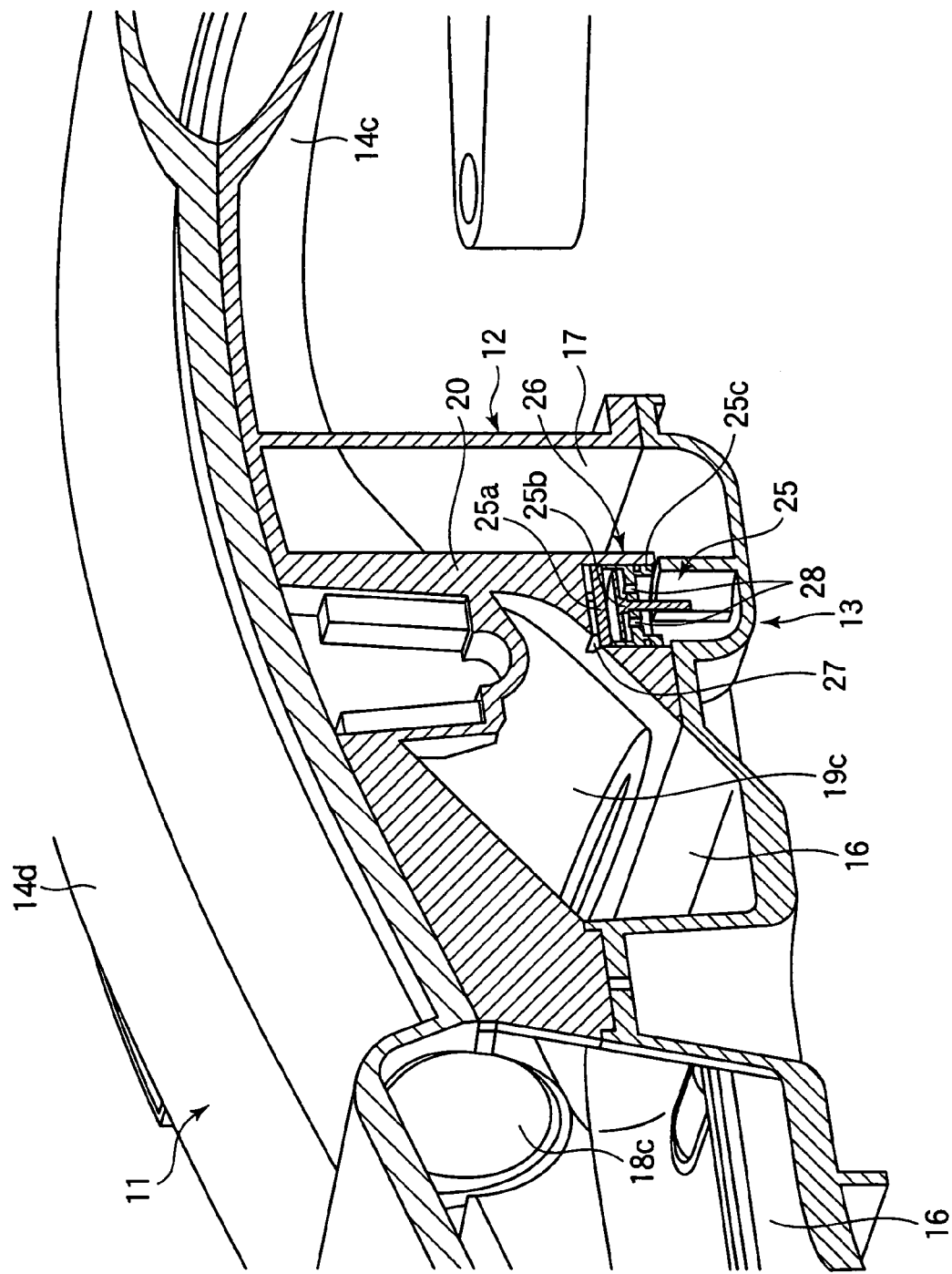
FIG. 4 is a sectional perspective view of the negative pressure check valve unit, where some components are not shown for ease of illustration.
Figure 5:
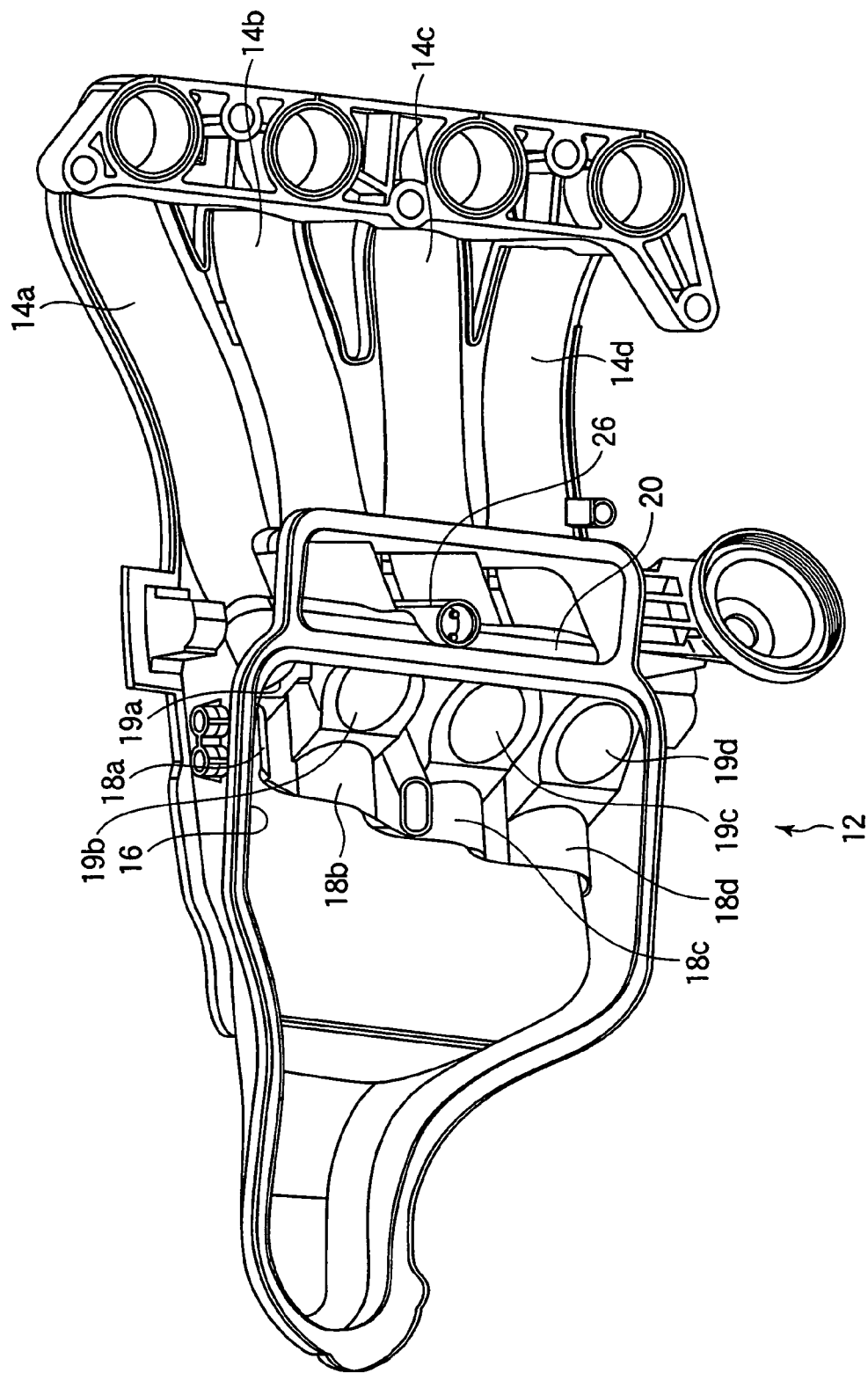
FIG. 5 is a perspective view of the midsection block viewed from the bottom side.

Next, with reference to FIGS. 3 to 5, the structure and the arrangement of the negative pressure check valve 25 of the embodiment will be explained. FIG. 4 is a sectional perspective view of the negative pressure check valve unit 25, where some components are not shown for ease of illustration. FIG. 5 is a perspective view of the midsection block 12 viewed from the bottom side.

With reference to FIGS. 4 and 5, the midsection block 12 is provided with a partition wall 20 that separates the surge tank 16 and the vacuum chamber 17. In the middle of the partition wall 20 along the lateral direction of the intake manifold 10 (the direction across the ducts), there is provided a check valve receptacle 26 that is formed as a substantially cylindrical hollow to hold the negative pressure check valve unit 25 therein. At the top of the sidewall of the check valve receptacle 26, i.e. where the inner surface of the sidewall intersects with the ceiling, a pressure inlet 27 is formed that interconnects the surge tank 16 and the vacuum chamber 17. The pressure inlet 27 is positioned inside the surge tank 16 on the downstream side or the side close to the engine with respect to the bifurcated ducts 18a–18d and 19a–19d which protrude inside the surge tank 16.

The negative pressure check valve unit 25 has a filter 25a, a check valve 25b, and valve support 25c, and is accommodated inside the check valve receptacle 26. The filter 25a is arranged below the ceiling of the check valve receptacle 26 at a predetermined distance. Further, the check valve 25b which is supported by the valve support 25c is arranged beneath the filter 25a. The valve support 25c is formed of pressure inlets 28 which can be opened and shut by the check valve 25b. Namely, the pressure inlets 28 are opened only when the pressure inside the surge tank 16 is lower than the pressure inside the vacuum chamber 17, so that the negative pressure inside the surge tank 16 is introduced inside the vacuum chamber 17 through the pressure inlets 27 and 28, and is accumulated therein.

As described above, according to the intake manifold of the present embodiment, since the pressure inlet of the negative pressure check valve unit is positioned on the side closer to the engine than the upstream ends of the intake ducts inside the surge tank, adverse effects due to the back blow from the intake ducts to the negative pressure check valve are reduced. Further, according to the intake manifold of the present embodiment, since the vacuum chamber is integrally provided adjacent to the surge tank, on the side closer to the engine, and the negative pressure check valve is provided in the partition wall between the surge tank and the vacuum chamber, the mechanism relating to the negative pressure check valve unit can be made compact and simple, thus the number of components can be reduced.

Further, the outboard motor is generally disposed with its crankshaft vertical and the intake manifold is mounted on the side of the engine, so that the intake manifold of the embodiment for the outboard motor is attached to the engine with its lateral direction (the direction perpendicular to the segment III—III of FIG. 2, in which the intake ducts are alined side-by-side) being vertical. Therefore, in the present embodiment, the negative pressure check valve is less affected by gasoline vapor and a drip when it is arranged about the center in the lateral direction of the intake manifold.

Although the embodiment of the present invention have been described herein with reference to the accompanying drawings, obviously many modifications and changes may be made by those skilled in this art without departing from the scope of the invention.

The present disclosure relates to subject matter contained in Japanese Patent Application No. 2003-168880 (filed on Jun. 13, 2003) which is expressly incorporated herein, by reference, in its entirety.

What is claimed is:

1. An intake manifold, comprising:
    a surge tank;
    a plurality of intake ducts, each intake duct having an upstream end and a downstream end, with the upstream ends of the plurality of intake ducts protruding into an inside of the surge tank;
    a vacuum chamber;
    a negative pressure check valve that enables negative pressure induced in the surge tank to flow into the vacuum chamber; and
    a pressure inlet, formed inside of the surge tank to lead negative pressure induced inside the surge tank to the negative pressure check valve, the pressure inlet being positioned on a side closer to an engine than the respective upstream ends of the plurality of intake ducts.

2. An intake manifold according to claim 1, wherein the vacuum chamber is integrally provided adjacent to the surge tank, on a side closer to the engine, and the negative pressure check valve is provided on a partition wall between the vacuum chamber and the surge tank.

3. An intake manifold according to claim 1, wherein the pressure inlet is arranged at about a center of a portion of the surge tank that connects with the vacuum chamber.

4. An intake manifold according to claim 1, further comprising a throttle mounting port on an upstream side of the intake manifold.

5. An intake manifold according to claim 1, wherein the each of the plurality of intake ducts includes an upper bifurcated duct, a lower bifurcated duct, and a main duct.

6. An intake manifold according to claim 5, wherein, for each of the plurality of intake ducts, the upper bifurcated duct is longer than the corresponding lower bifurcated duct.

* * * * *